(12) United States Patent
Hale et al.

(10) Patent No.: US 6,792,467 B2
(45) Date of Patent: *Sep. 14, 2004

(54) LAYER MANAGER

(75) Inventors: Douglas LaVell Hale, Orem, UT (US);
Michael D. Wright, Sandy, UT (US);
Merrill Kay Smith, Riverton, UT (US);
David O. Cox, Orem, UT (US); Kyle Bryan Seegmiller, Salt Lake City, UT (US); Jonathan Brett Wood, Spanish Fork, UT (US)

(73) Assignee: Brycen Co., Ltd., Tokyo (JP)

( * ) Notice: Subject to any disclaimer, the term of this patent is extended or adjusted under 35 U.S.C. 154(b) by 628 days.

This patent is subject to a terminal disclaimer.

(21) Appl. No.: 09/825,670

(22) Filed: Apr. 3, 2001

(65) Prior Publication Data

US 2002/0143986 A1 Oct. 3, 2002

(51) Int. Cl.$^7$ .............................................. G06F 15/16
(52) U.S. Cl. ................... 709/229; 709/230; 709/232; 709/236; 709/238; 709/244; 370/230; 370/235
(58) Field of Search ............................ 709/230, 232, 709/236, 238, 244, 229; 370/230, 235

(56) References Cited

U.S. PATENT DOCUMENTS

| | | | | |
|---|---|---|---|---|
| 5,124,984 A | * | 6/1992 | Engel | 370/230 |
| 5,920,703 A | * | 7/1999 | Campbell et al. | 709/236 |
| 5,951,647 A | * | 9/1999 | Beah et al. | 709/232 |
| 6,188,675 B1 | * | 2/2001 | Casper et al. | 370/254 |
| 6,240,090 B1 | * | 5/2001 | Enhager | 370/241.1 |
| 6,434,378 B1 | * | 8/2002 | Fougnies | 455/406 |
| 6,452,910 B1 | * | 9/2002 | Vij et al. | 370/310 |
| 6,651,117 B1 | * | 11/2003 | Wilson et al. | 710/33 |
| 6,721,274 B2 | * | 4/2004 | Hale et al. | 370/235 |
| 2001/0006512 A1 | * | 7/2001 | Takabatake et al. | 370/329 |
| 2002/0003789 A1 | * | 1/2002 | Kim et al. | 370/338 |
| 2002/0081971 A1 | * | 6/2002 | Travostino | 455/41 |
| 2002/0129236 A1 | * | 9/2002 | Nuutinen | 713/151 |
| 2002/0159406 A1 | * | 10/2002 | Fukuda | 370/328 |

OTHER PUBLICATIONS

Stevens, W. Richard, "TCP/IP Illustrated, vol. 1," 1994, Addison–Wesley, pp. 9–11.

* cited by examiner

*Primary Examiner*—Nabil El-Hady
(74) *Attorney, Agent, or Firm*—Sawyer Lawyer Group LLP

(57) ABSTRACT

The present invention provides an improved method and system for controlling packet flow through a protocol stack. The system comprises the layer manager which interfaces with each stack layer. The layer manager handles the packet flow to the stack layers. For a new packet path to be supported, only the Layer Manager needs to be modified, not the stack layers. This makes the implementation of the layers in the protocol stack easier. In an alternative embodiment, the layer manager comprises a plurality of protocol descriptor lists for supported services and uses these lists to route a packet to the appropriate stack layer. With this alternative embodiment, new stack layers may be inserted into the protocol stack without the need to modify the existing stack layers.

22 Claims, 7 Drawing Sheets

LAYER MANAGER

FIELD OF THE INVENTION

The present invention relates to networks, and more particularly to protocol stacks for networks.

BACKGROUND OF THE INVENTION

The Bluetooth™ networking protocol is well known in the art. FIG. 1 illustrates a standard Bluetooth protocol stack. The stack 100 includes a Host Controller Interface (HCI) layer 106, a Logical Link Control and Adaptation Protocol (L2CAP) layer 108, a Telephony Control Protocol Specification (TCS) layer 110, a Service Discovery Protocol (SDP) layer 112, and a RFCOMM protocol layer 114.

The HCI layer 106 provides a command interface which accepts communications over the physical bus (not shown). The L2CAP layer 108 supports higher level protocol multiplexing, packet segmentation and reassembly, and the conveying of quality of service information.

The TCS layer 110 provides call control and signaling of voice channels. The RFCOMM protocol layer 114 provides emulation of serial ports over the L2CAP layer 108.

The SDP layer 112 provides a means for applications to discover which services are provided by or available through a device. A Bluetooth device may act as an SDP client querying services, an SDP server providing services, or both. Each service registers with the SDP server, and information concerning each service is cataloged in service records. Through the SDP layer 112, a client may send a request to the SDP server to ask what services a remote device provides. The SDP server responds with service records of the services provided by the remote device. Part of each service record is a protocol descriptor list (PDL). The PDL comprises a list of layers of the protocol stack 100 through which to route a packet for the particular service.

However, because the stack layers 106–114 have well defined upper and lower edges, each of the layers 106–114 require intimate knowledge of the stack layer "above" and "below" it in the protocol stack 100. For each path of a packet through the stack 100, the stack layers 106–114 must be specifically coded to talk to the stack layer above and below. Thus, when a new path is to be supported, one or more of the stack layers 106–114 must be modified. In addition, when a stack layer is to be added between two of the layers 106–114, one or more of the stack layers 106–114 must also be modified. For example, assume that a layer is to be added between the RFCOMM layer 114 and the L2CAP layer 108. The RFCOMM layer 114 must be modified to talk down stream to the new layer instead of the L2CAP layer 108, and the L2CAP layer 108 must be modified to talk upstream to the new layer instead of the RFCOMM layer 114. This is burdensome and leads to considerable complexity in the protocol stack 100.

Accordingly, there exists a need for an improved protocol stack for a network. The present invention addresses such a need.

SUMMARY OF THE INVENTION

The present invention provides an improved method and system for controlling packet flow through a protocol stack. The system comprises the layer manager which interfaces with each stack layer. The layer manager handles the packet flow to the stack layers. For a new packet path to be supported, only the Layer Manager needs to be modified, not the stack layers. This makes the implementation of the layers in the protocol stack easier. In an alternative embodiment, the layer manager comprises a plurality of protocol descriptor lists for supported services and uses these lists to route a packet to the appropriate stack layer. With this alternative embodiment, new stack layers may be inserted into the protocol stack without the need to modify the existing stack layers.

DETAILED DESCRIPTION

The present invention provides an improved protocol stack for a network. The following description is presented to enable one of ordinary skill in the art to make and use the invention and is provided in the context of a patent application and its requirements. Various modifications to the preferred embodiment will be readily apparent to those skilled in the art and the generic principles herein may be applied to other embodiments. Thus, the present invention is not intended to be limited to the embodiment shown but is to be accorded the widest scope consistent with the principles and features described herein.

To more particularly describe the features of the present invention, please refer to FIGS. 2 through 7 in conjunction with the discussion below.

Figure 1:
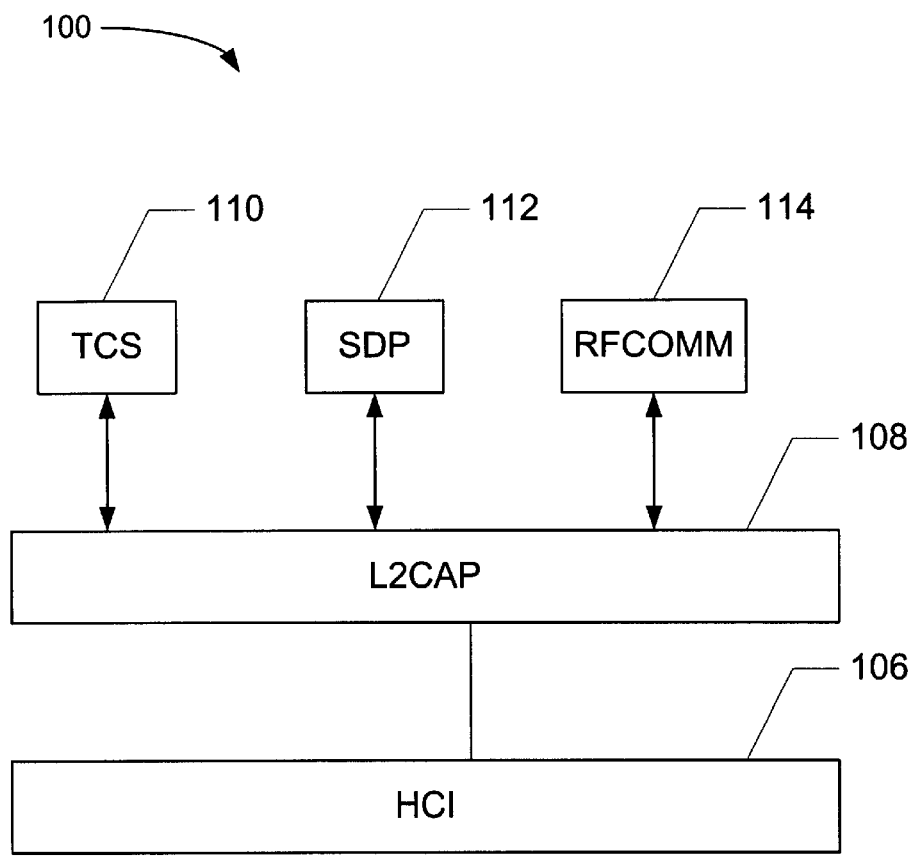
FIG. 1 illustrates a standard Bluetooth protocol stack.
Figure 2:
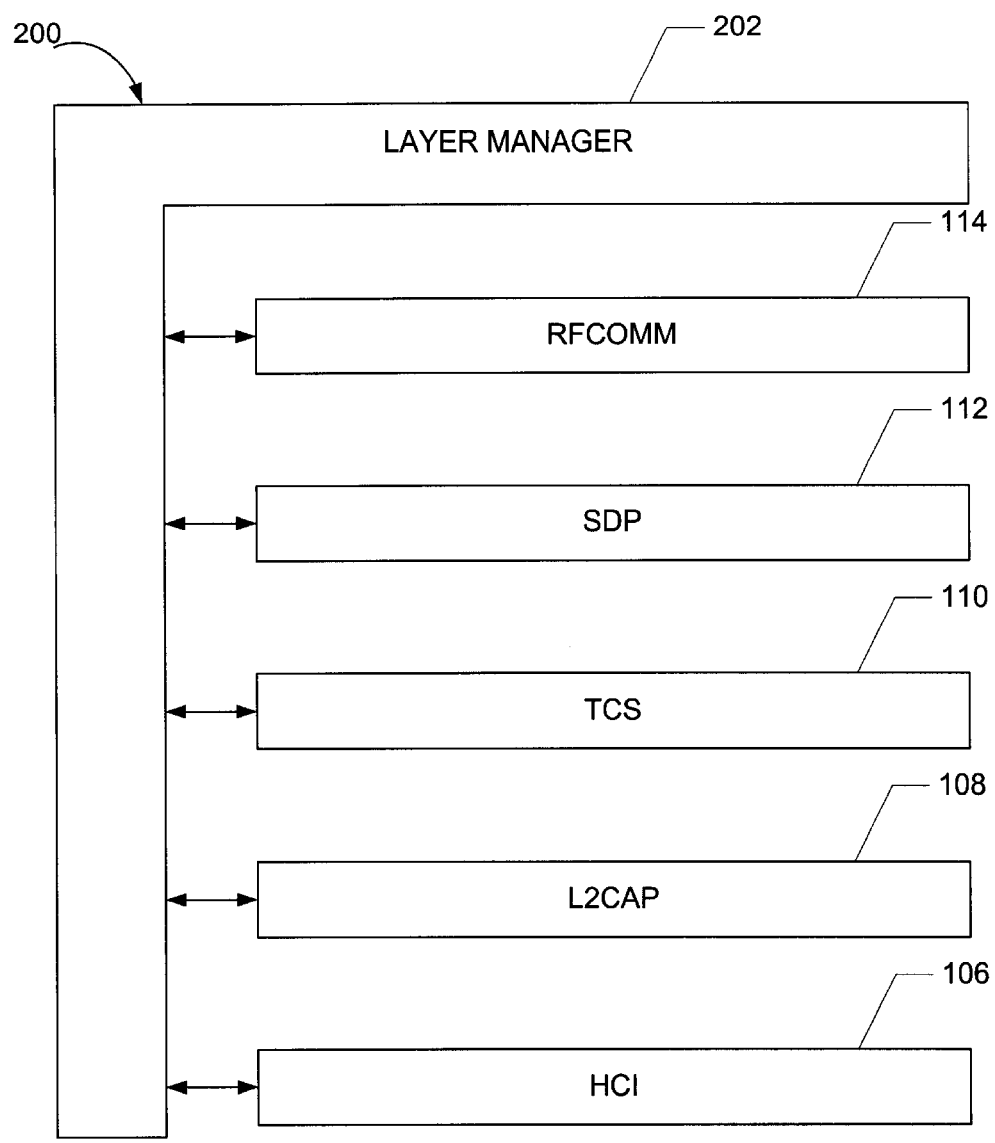
FIG. 2 illustrates a preferred embodiment of a protocol stack in accordance with the present invention.

FIG. 2 illustrates a preferred embodiment of a protocol stack in accordance with the present invention. The protocol stack 200, in addition to the stack layers 106–114 described in conjunction with FIG. 1, comprises a Layer Manager 202 which interfaces with each stack layer 106–114. The Layer Manager 202 handles the packet flow to the stack layers 106–114. The Layer Manager 202 allows each stack layer 106–114 to process the packet without the need to have knowledge of which stack layers reside directly above and below them. Each stack layer concerns itself only with whether the packet is to travel "up" or "down" the stack 200. Each stack layer receives its packet from the Layer Manager 202, and when it is done processing the packet, it gives the packet back to the Layer Manager 202. The Layer Manager 202 then routes the packet to the next stack layer.

In the preferred embodiment, the packet flow is controlled by hard-coding the paths into the Layer Manager 202. Thus, for a new packet path to be supported, only the Layer Manager 202 need to be modified. The stack layers 106–114 do not.

Figure 3:
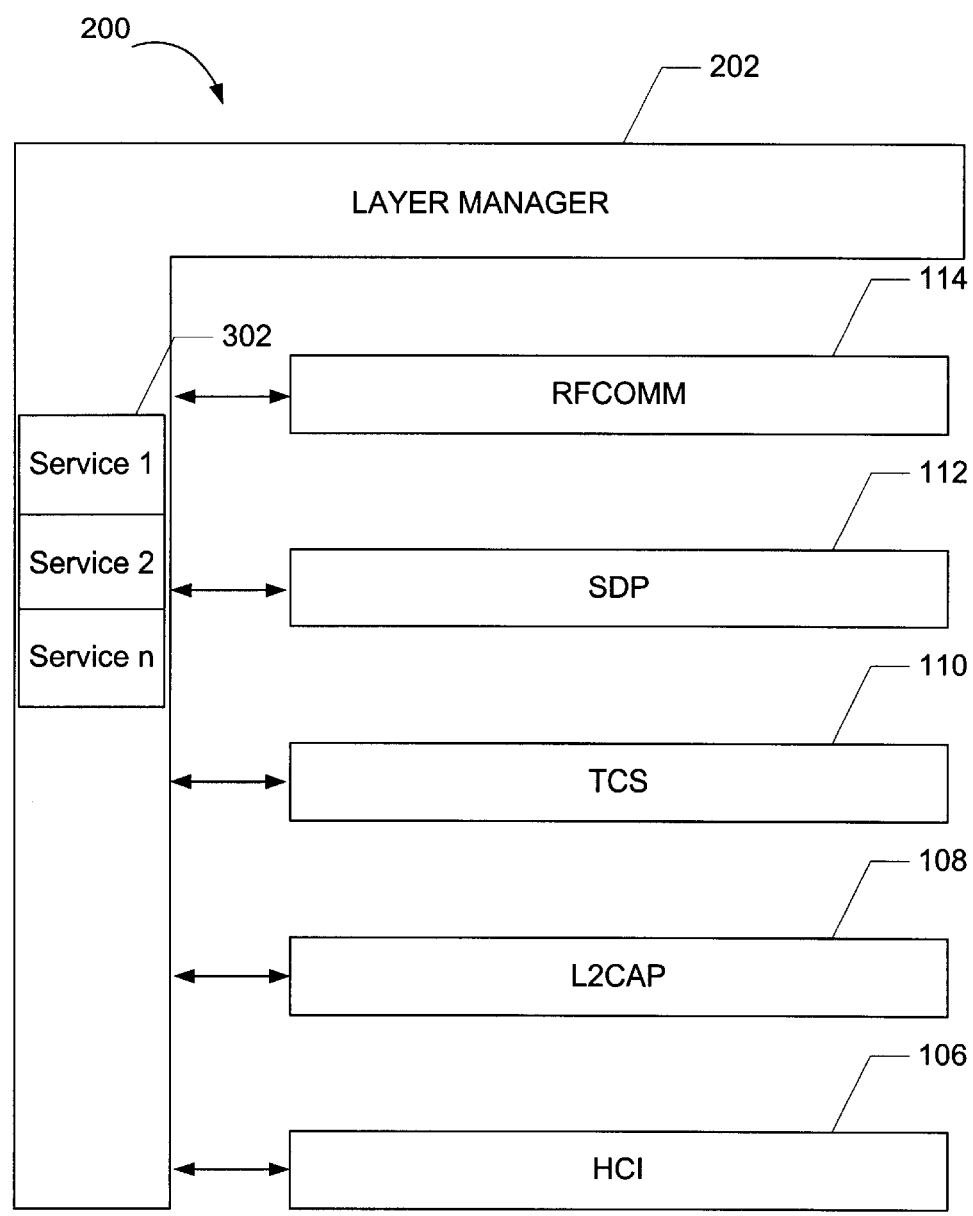
FIG. 3 illustrates the preferred embodiment of the protocol stack with a Layer Manager comprising protocol descriptor lists in accordance with the present invention.

An alternate method of controlling the packet flow through the stack 200 is for the Layer Manager 202 to comprise a plurality of protocol descriptor lists (PDL). FIG. 3 illustrates the preferred embodiment of the protocol stack 200 with a Layer Manager 202 comprising PDL 302 in accordance with the present invention. In the preferred embodiment, when a service is registered with a SDP server, as described above, the SDP server notifies the Layer Manager 202 and provides a copy of the PDL for that service. Also, the Layer Manager 202 contains a set of predefined PDL's for services provided by the clients. For example, for the RFCOMM service, the list is the HCI layer 106, the L2CAP layer 108, and the RFCOMM layer 114. If the packet is traveling up the stack 200, then the order is the HCI layer 106, the L2CAP layer 108, and the RFCOMM layer 114. If the packet is traveling down the stack 200, then the order is the RFCOMM layer 114, the L2CAP layer 108, and then the HCI layer 106. By using the PDL 302 for a particular service, the Layer Manager 202 knows to which layers of the stack 200 the packet should be routed.

Although the present invention is described with the Layer Manager receiving the PDL's in the above manner, other methods of obtaining the PDL can be used without departing from the spirit and scope of the present invention.

Figure 4:
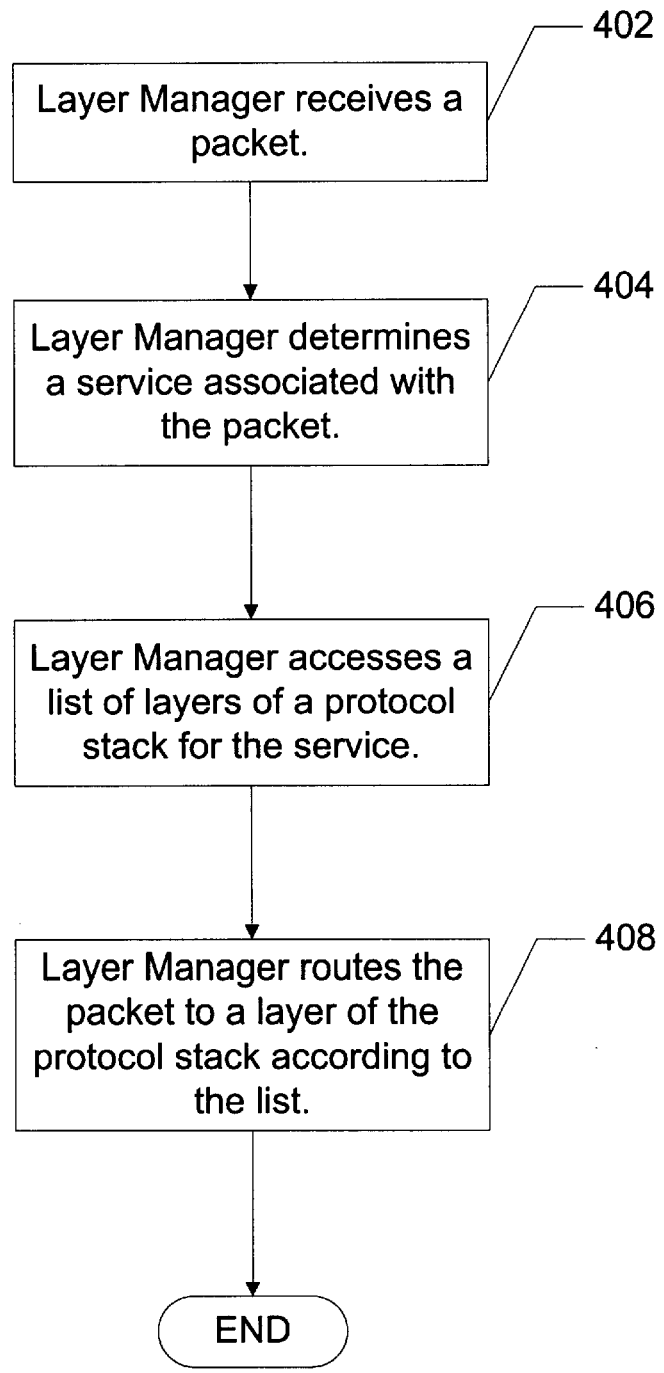
FIG. 4 is a flowchart illustrating a preferred embodiment of a method for controlling packet flow through the protocol stack in accordance with the present invention.

FIG. 4 is a flowchart illustrating a preferred embodiment of a method for controlling packet flow through the protocol stack in accordance with the present invention. First, the Layer Manager 202 receives a packet, via step 402. Next, the Layer Manager 202 determines a service associated with the packet, via step 404. In the preferred embodiment, this determination is based on the protocol/service multiplexer (PSM) field. The PSM is 16-bit field occurring after the header in the packet which indicates the upper-level protocol the packet originated from. The PSM field references the PDL 302 to be used for the packet.

The Layer Manager 202 accesses the PDL 302 for the service, via step 406. The PDL 302 comprises a list of layers of the protocol stack 200 for the service. Then, the Layer Manager 202 routes the packet to a layer of the protocol stack 200 according to the list, via step 408.

For example, assume a packet is to be sent up through the stack 200 for the RFCOMM service. The packet is received by the Layer Manager 202, via step 402. Through the packet's PSM field, the Layer Manager 202 determines that the RFCOMM service is associated with the packet, via step 404. The Layer Manager 202 then accesses a PDL for the RFCOMM service, via step 406. The RFCOMM service's PDL includes the HCI layer 106, the L2CAP layer 108, and the RFCOMM layer 114. The Layer Manager 202 then routes the packet to the HCI layer 106, via step 408. The HCI layer 106 processes the packet and returns it to the Layer Manager 202.

The Layer Manager 202 receives the packet from the HCI layer 106, via step 402. Again, through the packet's PSM field, it determines that the RFCOMM service is associated with the packet, via step 404, and accesses the PDL for the RFCOMM service, via step 406. The Layer Manager 202 knows that the packet was received from the HCI layer 106, and thus routes it to the next layer on the PDL, the L2CAP layer 108, via step 408. The L2CAP layer 108 process the packet and returns it to the Layer Manager 202.

The Layer Manager 202 receives the packet from the L2CAP layer 108, via step 402. It determines that the RFCOMM service is associated with the packet, via step 404, and accesses the PDL for the RFCOMM service, via step 406. The Layer Manager 202 knows that the packet was received from the L2CAP layer 108, and thus routes it to the next layer on the PDL, the RFCOMM layer 112, via step 408.

In this manner, each stack layer 106–114 communicates with the Layer Manager 202 and not with each other. The stack layers 106–114 thus need not have knowledge of the other layers or of the proper routing of the packet. This alternate method of controlling the packet flow has the added advantage of allowing easier insertion of new stack layers into the stack 200. When a new layer is to be added to the stack 200, the new layer is implemented so that it interfaces with the Layer Manager 202 in the same way as the other stack layers 106–114. None of the existing stack layers 106–114 need to be modified. This makes the modification of the protocol stack 200 easier.

With the protocol stack 200 comprising the Layer Manager 202, other advantages may be realized. For example, the instrumentation of stack components is considerably simplified with use of the Layer Manager 202. A "stack component", as used in this specification, is software which implements a layer of the protocol stack 200. Instrumentation of the stack components 106–114 is desirable to enable measurement of a stimulus received by a stack component and/or a response of the stack component to a stimulus. The instrumentation provides information which aid in fixing problems, optimizing performance and behavior, gathering utilization statistics, etc.

To instrument the stack components 106–114 in the conventional protocol stack 100, code must be added to the stack components 106–114 wherever data is available or where information can be gathered. Since the stack components 106–114 communicate with each other through private and unique interfaces, each stack component 106–114 must be instrumented separately. This often results in repetitive, and possibly incompatible, work being done on each interface. The data acquired at each interface may be dissimilar, requiring more processing before analysis.

However, with the protocol stack 200 in accordance with the present invention, because the Layer Manager 202 is responsible for the routing of packets between stack components 106–114, it also is aware of the stimulus and response of each stack component 106–114. Thus, to instrument the protocol stack 200, the Layer Manager 202 is instrumented without the need to instrument the stack components 106–114. Since the Layer Manager 202 provides a single interface through which all stimuli and responses are passed, the packet is captured at a single point and is similar in format. This reduces the amount of code required to capture and analyze the data in the packet.

Figure 5:
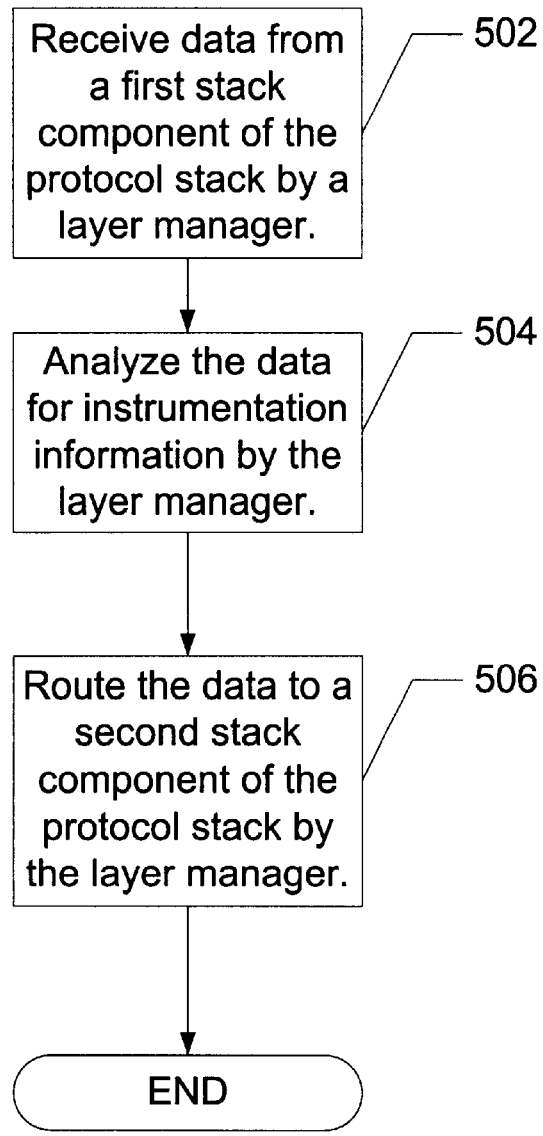
FIG. 5 is a flowchart illustrating a preferred embodiment of a method for providing stack component instrumentation in accordance with the present invention.

FIG. 5 is a flowchart illustrating a preferred embodiment of a method for providing stack component instrumentation in accordance with the present invention. First, the Layer Manager 202 receives data in a packet from a first stack component in the protocol stack 200, via step 502. Next, the Layer Manager 202 analyzes the data for instrumentation information, via step 504. Then, the Layer Manager 202 routes the data to a second stack component, either below or above it, in the protocol stack 200, via step 506.

Another advantage which may be realized with the protocol stack 200 comprising the Layer Manager 202 is the ability to provide access control within the protocol stack 200. Conventionally, security mechanisms provide access control at the packet level. "Firewalls" are examples of such a security mechanism. Firewalls filter packets based on their addresses and port numbers. All packets with the address and the port number are blocked. However, these mechanisms do not provide access control within a protocol stack, i.e., between the layers of the protocol stack. They are not able to authenticate users at the stack layer level.

However, the protocol stack 200 in accordance with the present invention can provide access control within a protocol stack through an Access Mediator in the Layer Manager 202. The Access Mediator is a software which enforces the rules of a predetermined security policy. In the preferred embodiment, the security policy is subject (people) based. The rules of the security policy determines which subjects can have access to which objects (data) to perform a requested operation (e.g. read/write).

Figure 6:
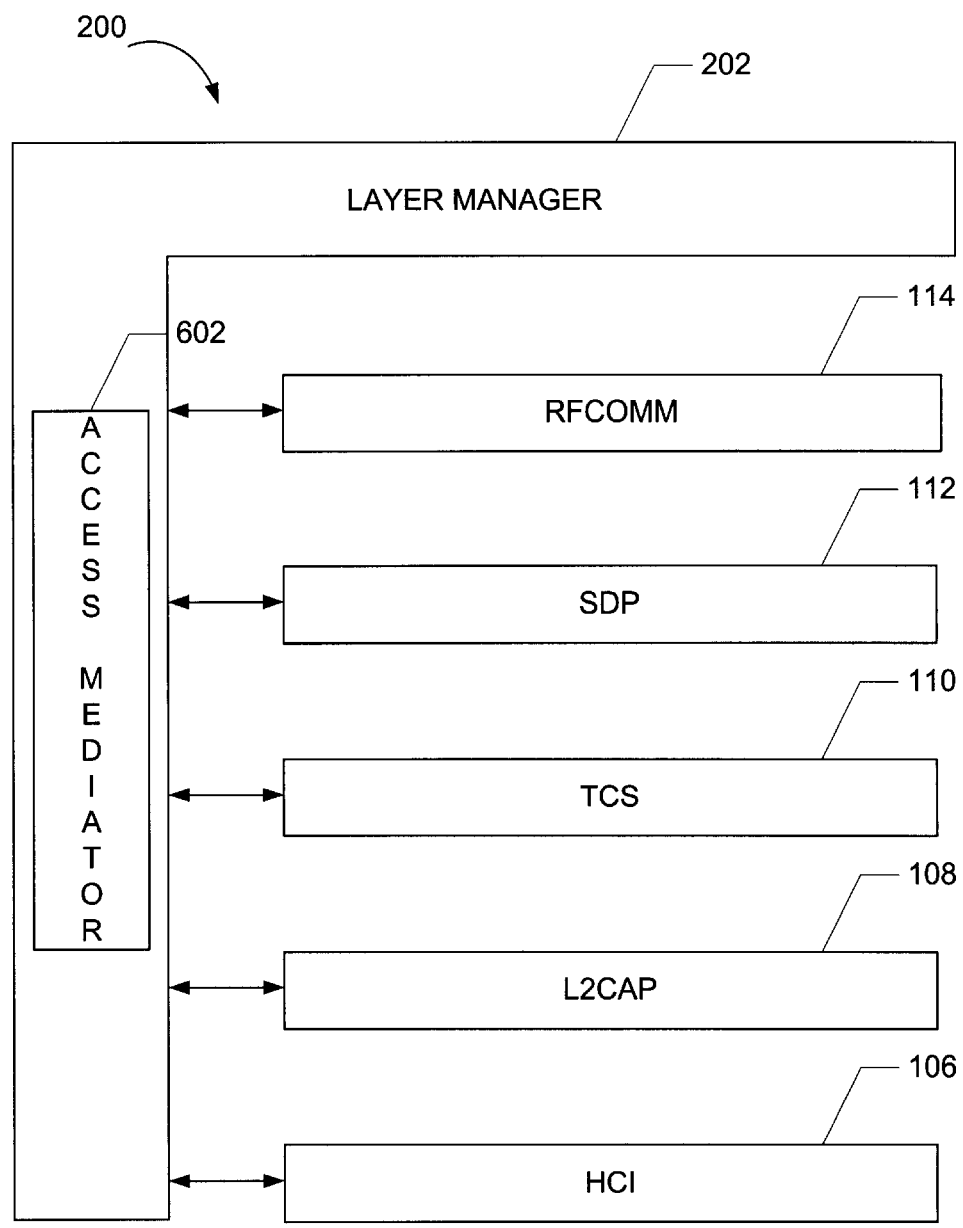
FIG. 6 illustrates a preferred embodiment of a protocol stack which utilizes the method for providing access control within the protocol stack in accordance with the present invention.

FIG. 6 illustrates a preferred embodiment of a protocol stack which utilizes the method for providing access control within the protocol stack in accordance with the present invention. The protocol stack 200, in addition to the layers 106–114 and the Layer Manager 202, described in conjunction with FIG. 2, comprises the Access Mediator 602 implemented in the Layer Manager 202. In this manner, the advantages provided by the Layer Manager 202 is realized in providing access control within the stack 200.

Figure 7:
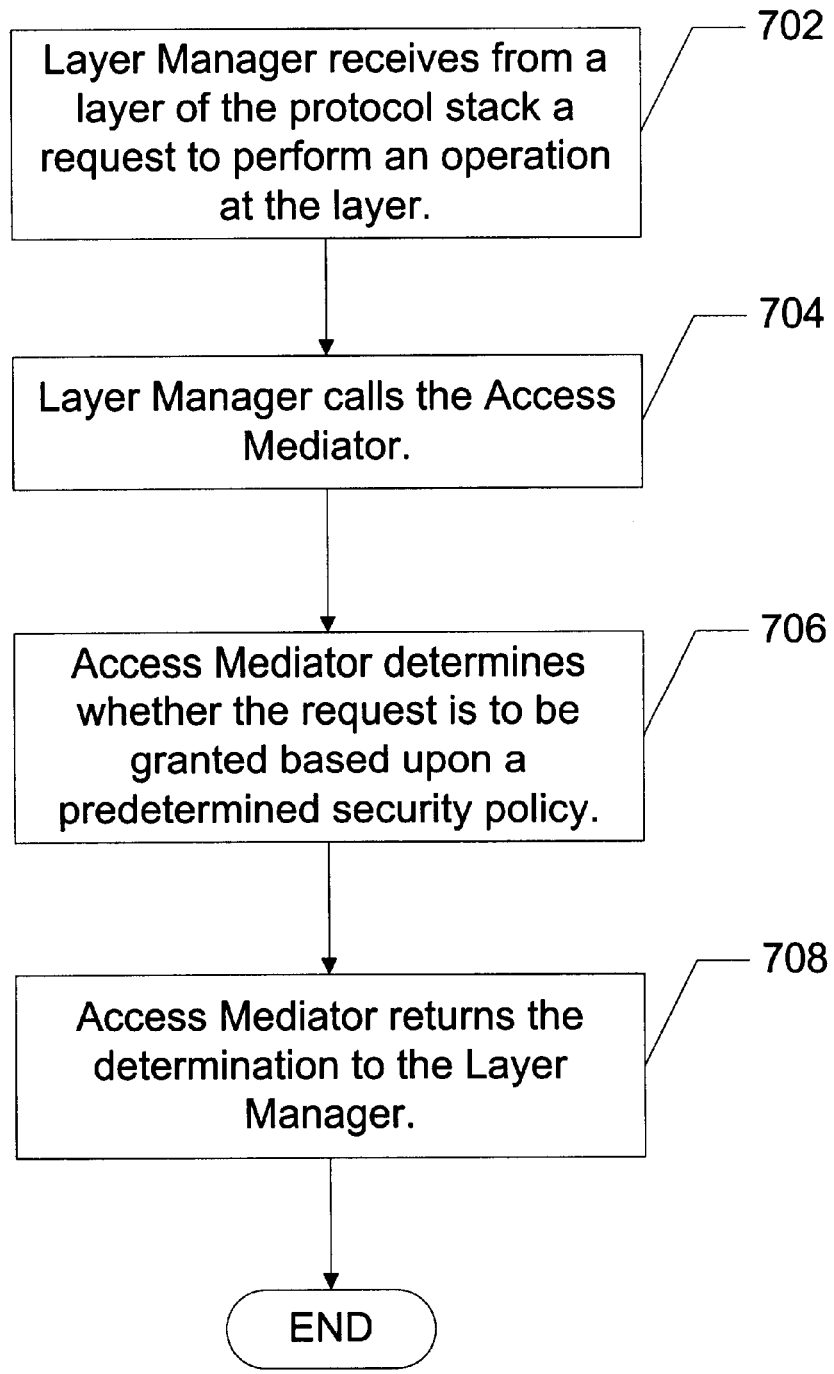
FIG. 7 is a flowchart illustrating the method for providing access control as utilized by the preferred embodiment of the protocol stack in accordance with the present invention.

FIG. 7 is a flowchart illustrating the method for providing access control as utilized by the preferred embodiment of the protocol stack in accordance with the present invention. First, the Layer Manager 202 receives a request from a layer of the protocol stack 200 to perform an operation at the layer, via step 702. In this embodiment, the operation is to be performed on an object by a particular subject. The Layer Manager 202 then calls the Access Mediator 602, via step 704. In calling the Access Mediator 602, the Layer Manager 202 passes the subject's identity, the object's identity, and the requested operation. The Access Mediator 602 determines whether the request is to be granted based upon a predetermined security policy, via step 706. Then, the Access Mediator 602 returns the determination to the Layer Manager 202, via step 708. If the Access Mediator 602 determines that the subject can access the object to perform the requested operation, then the operation is allowed to be performed at the layer. If the Access Mediator 602 determines that the subject cannot access the object to perform the requested operation, then the operation is blocked.

By implementing the Access Mediator 602 in the Layer Manager 202, the stack layers 106–114 need not be aware of the Access Mediator 602, or even that there is a security policy at all. Awareness of the Access Mediator 602 is only required of the Layer Manager 202. Since the stack layers 106–114 need not be aware of the Access Mediator 602, they also do not disrupt the Access Mediator 602, resulting in a more secure protocol stack.

Although the present invention is described in the context of the Bluetooth protocol stack, it may be applied to other protocol stacks without departing from the spirit and scope of the present invention.

An improved method and system for controlling packet flow through a protocol stack has been disclosed. The system comprises a layer manager which interfaces with each stack layer. The layer manager handles the packet flow to the stack layers. For a new packet path to be supported, only the Layer Manager needs to be modified, not the stack layers. This makes the implementation of the layers in the protocol stack easier. In an alternative embodiment, the layer manager comprises a plurality of protocol descriptor lists for supported services and uses these lists to route a packet to the appropriate stack layer. With this alternative embodiment, new stack layers may be inserted into the protocol stack without the need to modify the existing stack layers. Other advantages, such as increased ease in instrumenting the stack layers and in providing access control within the protocol stack, may be realized using the protocol stack comprising the layer manager.

Although the present invention has been described in accordance with the embodiments shown, one of ordinary skill in the art will readily recognize that there could be variations to the embodiments and those variations would be within the spirit and scope of the present invention. Accordingly, many modifications may be made by one of ordinary skill in the art without departing from the spirit and scope of the appended claims.

What is claimed is:

1. A method for routing a packet through a protocol stack, comprising the steps of:

(a) receiving a packet from a first stack layer of the protocol stack by a layer manager, wherein the layer manager may interface with each layer of the protocol stack;

(b) determining a route for the packet by the layer manager, comprising:

(b1) determining a service associated with the packet by the layer manager, comprising:

(b1i) examining a protocol/service multiplexer (PSM) field in the packet by the layer manager; and (b1ii) determining a protocol descriptor list (PDL) referenced by the PSM field by the layer manager;and (b2) accessing a list of layers of the protocol stack for the service by the layer manager; and (c) routing the packet to a second layer of the protocol stack according to the route determined by the layer manager.

2. The method of claim 1, wherein the layer manager untilizes hard codes to determine the route for the packet.

3. The method of claim 1, wherein the accessing step (b2) comprises:

(b2i) accessing a PDL for the service by the layer manager.

4. The method of claim 1, wherein the determining step (b) further comprises:

(b3) analyzing the packet for instrumentation information by the layer manager.

5. The method of claim 1, wherein the receiving step (a) comprises:

(a1) receiving a request to perform an operation at the second layer of the protocol stack by the layer manager.

6. The method of claim 5, wherein the receiving step (a1) comprises:

(a1i) receiving the request by the layer manager to perform the operation on an object by a subject at the second layer of the protocols stack.

7. The method of claim 1, wherein the determining step (b) further comprises:

(b3) calling an access mediator by the layer manager;

(b4) determining if a request to perform an operation at the second stack layer is to be granted based upon a predetermined security policy by the access mediator; and (b5) providing the determination to the layer manager.

8. The method of claim 7, wherein the calling step (b3) comprises:

(b3i) passing a subject's identity, an object's identity, and a requested operation to the access mediator.

9. The method of claim 1, wherein the routing step (c) further comprises:
   (c1) allowing an operation to be performed at the second layer if a determination by an access mediator is to grant a request to perform the operation;
   (c2) blocking the operation if the determination is to not grant the request.

10. A system, comprising:
   a plurality of stack layers; and
   a layer manager interfaced with each of the plurality of stack layers wherein the layer manager routes packets through the plurality of stack layers, wherein the layer manager comprises a list of stack layers for a service, wherein the layer manager may route a packet to one of the plurality of stack layers according to the list, wherein the routing of the packet by the layer manager comprises the steps of:
   (a) receiving the packet;
   (b) determining the service associated with the packet, comprising:
      (b1) examining a PSM field in the packet; and
      (b2) determining a PDL referenced by the PSM field;
   (c) accessing the list of layers of the protocol stack for the service; and
   (d) routing the packet to one of the plurality of layers according to the list.

11. The system of claim 10, wherein the accessing step (c) comprises:
   (c1) accessing a PDL for the service.

12. The system of claim 10, wherein the layer manager is instrumented, wherein instrumenting the layer manager instruments the plurality of stack layers.

13. The system of claim 10, wherein the layer manager comprises an access mediator, wherein the layer manager may call the access mediator to determine if a request to perform an operation at one of the plurality of stack layers is to be granted.

14. A method for routing a packet through a protocol stack comprising the steps of:
   (a) receiving a packet from a first stack layer of the protocol stack by a layer manager, wherein the layer manager may interface with each layer of the protocol stack;
   (b) determining a route for the packet by the layer manager, comprising:
      (b1) determining a service associated with the packet by the layer manager, comprising:
         (b1i) examining a protocol/service multiplexer (PSM) field in the packet by the layer manager; and
         (b1ii) determining a protocol descriptor list (PDL) referenced by the PSM field by the layer manager; and
      (b2) accessing a list of layers of the protocol stack for the service by the layer manager; and
   (c) routing the packet to a second layer of the protocol stack according to the route determined by the layer manager.

15. The medium of claim 14, wherein the layer manger utilizes hard codes to determine the route for the packet.

16. The medium of claim 14, wherein the accessing instruction (b2) comprises instructions for:
   (b2i) accessing a PDL for the service by the layer manager.

17. The medium of claim 14, wherein the determining instruction (b) further comprises instructions for:
   (b3) analyzing the packet for instrumentation information by the layer manager.

18. The medium of claim 14, wherein the receiving instruction (a) comprises instructions for:
   (a1) receiving a request to perform an operation at the second layer of the protocol stack by the layer manager.

19. The medium of claim 18, wherein the receiving instruction (a1) comprises instructions for:
   (a1i) receiving the request by the layer manager to perform the operation on an object by a subject at the second layer of the protocols stack.

20. The medium of claim 14, wherein the determining instruction (b) further comprises instructions for:
   (b3) calling an access mediator by the layer manager;
   (b4) determining if a request to perform an operation at the second stack layer is to be granted based upon a predetermined security policy by the access mediator; and
   (b5) providing the determination to the layer manager.

21. The medium of claim 20, wherein the calling instruction (b3) comprises instructions for:
   (b3i) passing a subject's identity, an object's identity, and a requested operation to the access mediator.

22. The medium of claim 14, wherein the routing instruction (c) further comprises instructions for:
   (c1) allowing an operation to be performed at the second layer if a determination by an access mediator is to grant a request to perform the operation;
   (c2) blocking the operation if the determination is to not grant the request.

* * * * *